United States Patent
Wang et al.

(10) Patent No.: US 11,284,405 B2
(45) Date of Patent: Mar. 22, 2022

(54) METHOD OF REDUCING UPLINK INTER-CELL INTERFERENCE IN A CELLULAR COMMUNICATIONS NETWORK

(71) Applicant: Hong Kong Applied Science and Technology Research Institute Co., Ltd, Shatin (HK)

(72) Inventors: Zizhou Wang, Kowloon (HK); Qifeng Liao, Shunde District (CN); Jihui Zhang, Taipo (HK); Man Wai Kwan, Ma On Shan (HK); Kong Chau Tsang, Kowloon (HK)

(73) Assignee: Hong Kong Applied Science and Technology Research Institute Company Limited, Shatin (HK)

( * ) Notice: Subject to any disclaimer, the term of this patent is extended or adjusted under 35 U.S.C. 154(b) by 118 days.

(21) Appl. No.: 16/364,335

(22) Filed: Mar. 26, 2019

(65) Prior Publication Data

US 2020/0314863 A1 Oct. 1, 2020

(51) Int. Cl.
*H04W 72/08* (2009.01)
*H04L 5/00* (2006.01)
(Continued)

(52) U.S. Cl.
CPC ........ *H04W 72/082* (2013.01); *H04B 17/327* (2015.01); *H04B 17/382* (2015.01);
(Continued)

(58) Field of Classification Search
CPC .......... H04W 72/042; H04W 72/0413; H04W 72/082; H04W 24/10; H04W 72/04; H04W 52/243
See application file for complete search history.

(56) References Cited

U.S. PATENT DOCUMENTS 8,165,098 B2   4/2012  Teo et al.
9,326,151 B2   4/2016  Manssour
(Continued)

FOREIGN PATENT DOCUMENTS

CN   101039500 A   9/2007
CN   101282566 A   10/2008
(Continued)

OTHER PUBLICATIONS

LG Ellectronics Discussion on CLI measurement and reporting for duplexing flexibility, 3GPP TSG RAN WGI Meeting #90, R1-1713217, Aug. 25, 2017.
(Continued)

*Primary Examiner* — Asad M Nawaz
*Assistant Examiner* — Najeeb Ansari

(57) ABSTRACT

Described is a method of reducing uplink inter-cell interference in a cellular communications network. The method comprises identifying in a cell any user equipments (UEs) which are susceptible to interference (ISUs) from another UE, particularly another UE in a neighboring cell. The method includes identifying in said cell any UEs causing interference (ICUs) to at least one neighboring cell and, more particularly, causing interference to a UE in a neighboring cell. The identified ISUs and ICUs are combined into a priority list for frequency resource reservation or allocation in said cell. The method may include limiting the identification of ISUs and ICUs to a selected number of UEs within the cell.

16 Claims, 10 Drawing Sheets

(51) Int. Cl.
*H04J 11/00* (2006.01)
*H04B 17/382* (2015.01)
*H04B 17/327* (2015.01)
*H04W 72/10* (2009.01)

(52) U.S. Cl.
CPC ........ *H04J 11/0053* (2013.01); *H04L 5/0073* (2013.01); *H04W 72/10* (2013.01)

(56) References Cited

U.S. PATENT DOCUMENTS

| | | | | |
|---|---|---|---|---|
| 2011/0081865 A1* | 4/2011 | Xiao | ................ | H04W 72/1205 455/63.1 |
| 2014/0092785 A1* | 4/2014 | Song | ................ | H04W 28/0278 370/280 |
| 2014/0235255 A1* | 8/2014 | Manssour | ............. | H04W 16/10 455/447 |
| 2015/0141024 A1* | 5/2015 | Kapnadak | ............ | H04W 16/10 455/446 |
| 2015/0365180 A1* | 12/2015 | Bjorken | ................ | H04W 24/02 455/296 |
| 2016/0309356 A1* | 10/2016 | Madan | .............. | H04W 28/0236 |
| 2017/0026915 A1* | 1/2017 | Madan | ................ | H04W 52/146 |
| 2017/0111919 A1* | 4/2017 | Madan | .............. | H04W 72/1273 |
| 2017/0202006 A1* | 7/2017 | Rao | ................... | H04W 72/1231 |
| 2017/0346609 A1* | 11/2017 | Li | ........................ | H04W 72/10 |
| 2018/0152949 A1* | 5/2018 | Guo | ...................... | H04B 17/345 |
| 2019/0158240 A1* | 5/2019 | Li | ........................ | H04L 5/0032 |

FOREIGN PATENT DOCUMENTS

| | | |
|---|---|---|
| CN | 102256365 A | 11/2011 |
| CN | 102413477 B | 4/2012 |
| CN | 1013369539 A | 10/2013 |
| WO | 2013177774 A | 12/2013 |

OTHER PUBLICATIONS

Internation Search Report, PCT/CN2019/080392.

* cited by examiner

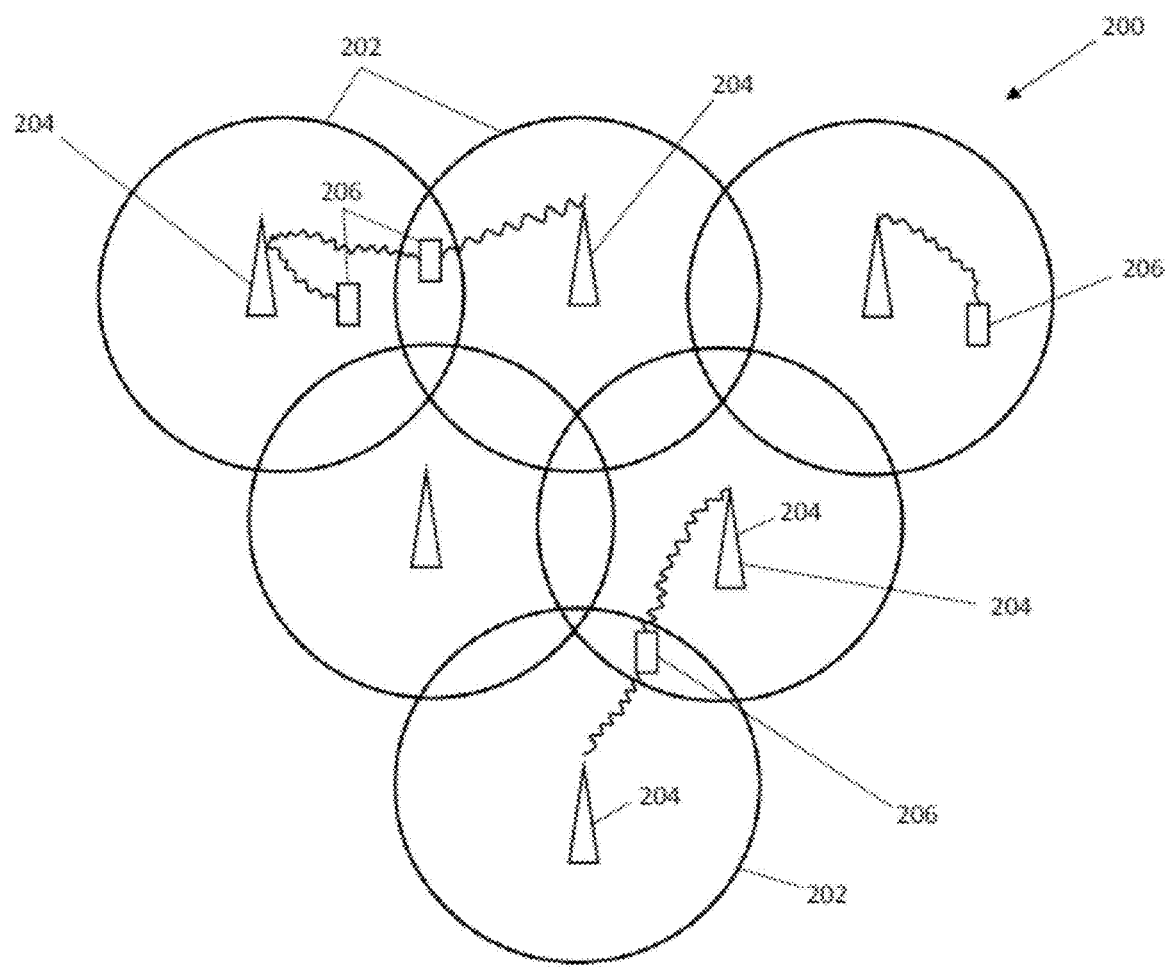
Figure 2
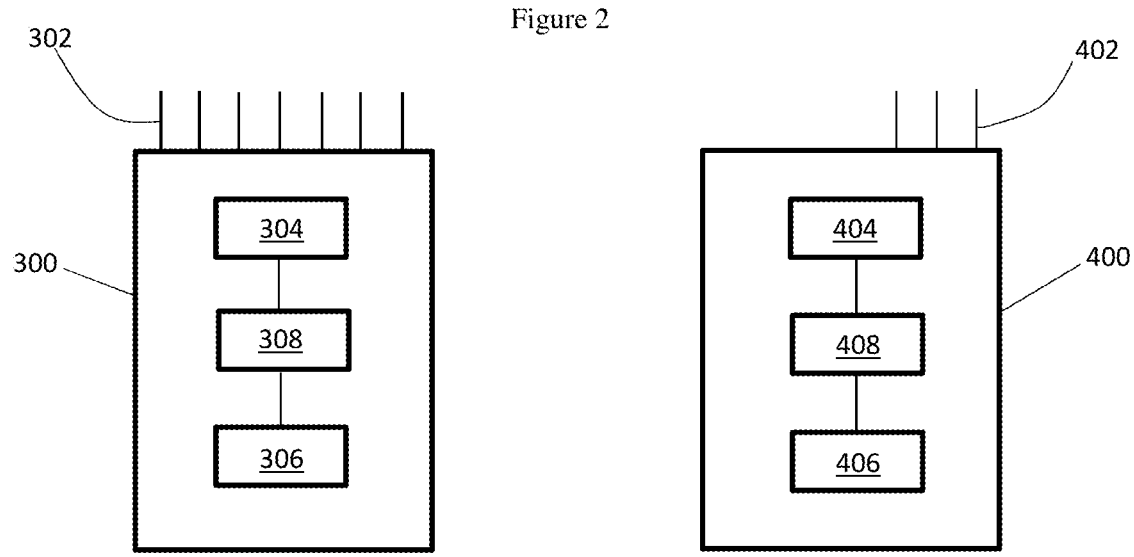
Fig. 3
Fig. 4

Resources in cell-edge band reserved for cell-edge users

METHOD OF REDUCING UPLINK INTER-CELL INTERFERENCE IN A CELLULAR COMMUNICATIONS NETWORK

FIELD OF THE INVENTION

The invention relates to a method of reducing uplink inter-cell interference (ICI) in a cellular communications network.

BACKGROUND OF THE INVENTION

Wireless communication networks such as Fourth Generation (4G, also referred to as Long Term Evolution (LTE)) networks are presently widely deployed to provide various telecommunication services such as telephony, video, data, messaging, and broadcasts. However, whilst current 4G technology offers much faster data rates than its previous generations, it has limitations due to its bandwidth, scalability and number of users under individual cells.

The new radio (NR) standard for Fifth Generation (5G) networks has been developed and is being rolled out to provide new functionalities including enabling the connection of many things in, for example, the Internet of Things (IoT) with low latency and very greatly increased speeds. NR builds upon today's LTE networks, expanding and improving existing coverage with the goal to facilitate enhanced mobile broadband by using 5G small cells to boost the data rates on an LTE anchor network.

ICI occurs when adjacent cells assign the same frequency to different user equipments (UEs). The most severe ICI originates from the frequency collision on the edges of the cells. If the frequency in which a first base station communicates with a first UE of a first cell is the same as the frequency in which a second base station communicates with a near-by second UE on the edge of an adjacent, second cell, then the ICI has the greatest impact in both downlink and uplink directions.

In both 4G and 5G networks, a conventional solution to ICI is Intercell Interference Coordination (ICIC) which can effectively reduce ICI in cell-edge regions. ICIC reduces ICI by applying restrictions to the radio resource management (RRM) block, improving favorable channel conditions across subsets of users that are severely impacted by interference, and thus attaining high spectral efficiency. This coordinated resource management can be achieved through fixed, adaptive or real-time coordination with the help of additional inter-cell signaling. In general, inter-cell signaling refers to the communication interface among neighboring cells and the received measurement message reports from UEs.

In a specific case, ICIC is defined in 3GPP release 8 as an interference coordination technology used in LTE systems. It reduces inter-cell interference by having UEs, at the same cell edge but belonging to different cells, use different frequency resources. Base stations that support this feature can generate interference information for each frequency resource (RB), and exchange the information with neighboring base stations through X2 messages. Then, from the messages, the neighboring base stations can learn the interference status of their neighbors, and allocate radio resources (frequency, transmission power, etc.) to their UEs in a way that will avoid or at least reduce ICI.

CN102413477 discloses a simulation method for ICIC. The method comprises the steps of: confirming UEs belonging to a cell-center user class and UEs belonging to a cell-edge user class; confirming a neighboring cell which has ICIC interaction with the cell; according to a high-interference indication preset value, overload indication and the information of the neighboring cell, confirming the priority of physical resource blocks of all UEs which take part in the ICIC; according to the priority of the physical resource blocks, carrying out scheduling of resources and then controlling the power; and according to the scheduling condition, setting the actual high-interference indication and overload indication of the cell, and noticing the neighboring cell. The method can be used for simulating and realizing upstream semi-static ICIC technology in a static planning simulation platform which is not capable of simulating information interaction of an X2 interface.

U.S. Pat. No. 9,326,151 discloses a method in a base station for assisting in a coordination of frequency band selections for interfering uplink transmissions in a cellular network. The base station selects a first frequency band and a second frequency band. The first frequency band is to be used in the first cell for uplink transmissions from which an estimated interference in a second cell exceeds a first threshold. The second frequency band is to be used in the first cell for uplink transmissions from which an estimated interference in a third cell exceeds a second threshold. The base station informs a serving base station of the second cell and a serving base station of the third cell about the selection, thereby assisting these base stations in coordinating their respective frequency band selection with that of the base station.

U.S. Pat. No. 8,165,098 discloses a method of allocating bandwidth from a radio frequency spectrum in a cellular network including a set of cells. Each cell includes a base station for serving a set of mobile stations in the cell. An area around each base station is partitioned into a center region and an edge region. In each base station, cell-center bandwidth for use by the mobile stations in the center region is reserved according to ICIC protocol, and cell-edge bandwidth for use by the mobile stations in the edge region is reserved according to the ICIC protocol.

Conventional ICIC does not, however, account for UEs with weak signal strength in the absence of a predefined measurement report type "Event A3" and does not take into account the interference level caused to a UE in a neighboring cell by an identified cell-edge UE.

It is therefore desired to have a method which can improve the resource sharing arrangement among UEs and base stations in an ICI environment in a cellular communications network. Thus, there remains a need for at least an improved method of reducing uplink ICI in a cellular communications network.

OBJECTS OF THE INVENTION

An object of the invention is to mitigate or obviate to some degree one or more problems associated with known methods of reducing uplink ICI in a cellular communications network.

The above object is met by the combination of features of the main claims; the sub-claims disclose further advantageous embodiments of the invention.

Another object of the invention is to improve the resource sharing arrangement among UEs and base stations in ICI environment in a cellular communications network.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method and an apparatus for uplink intercell interference mitigation in cellular, i.e. wireless, communications networks, i.e. for reducing uplink intercell interference.

In a first main aspect, the invention provides a method of reducing uplink inter-cell interference in a cellular communications network. The method comprises identifying in a cell any user equipments (UEs) which are susceptible to interference (ISUs) from another UE, particularly another UE in a neighboring cell. The method includes identifying in said cell any UEs causing interference (ICUs) to at least one neighboring cell and, more particularly, causing interference to a UE in a neighboring cell. The identified ISUs and ICUs are combined into a priority list for frequency resource reservation or allocation in said cell. The method may include limiting the identification of ISUs and ICUs to a selected number N of UEs within the cell, where N is selected according to one or more schemes.

In a second main aspect, the invention provides a user equipment (UE) type classification module for a cellular communications network base station, said module configured to: select N UEs from a base station scheduling user list for a cell served by the base station; identify which of said N UEs are susceptible to interference (ISUs); and identify which of said N UEs cause interference (ICUs) to at least one neighboring cell.

In a third main aspect, the invention provides a user equipment (UE) prioritization module for a cellular communications network base station, said module configured to: sort UEs identified as being susceptible to interference (ISUs) by reference to their signal strengths from low to high signal strength; and sort UEs identified as causing interference (ICUs) to at least one neighboring cell by reference to their level of interference from high to low level of interference to at least one neighboring cell.

In a fourth main aspect, the invention provides an apparatus for reducing uplink inter-cell interference in a cellular communications network, said apparatus configured to at least: a) identify in a cell user equipments (UEs) which are susceptible to interference (ISUs); b) identify in said cell UEs causing interference (ICUs) to at least one neighboring cell; and c) combine said ISUs and ICUs into a priority list for frequency resource reservation or allocation in said cell.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 2 is a diagram illustrating by way of example only an access network for embodiments of the present invention;

FIG. 3 illustrates a base station or eNodeB for embodiments of the invention;

FIG. 4 illustrates a UE for embodiments of the invention;

DESCRIPTION OF PREFERRED EMBODIMENTS

Figure 1:
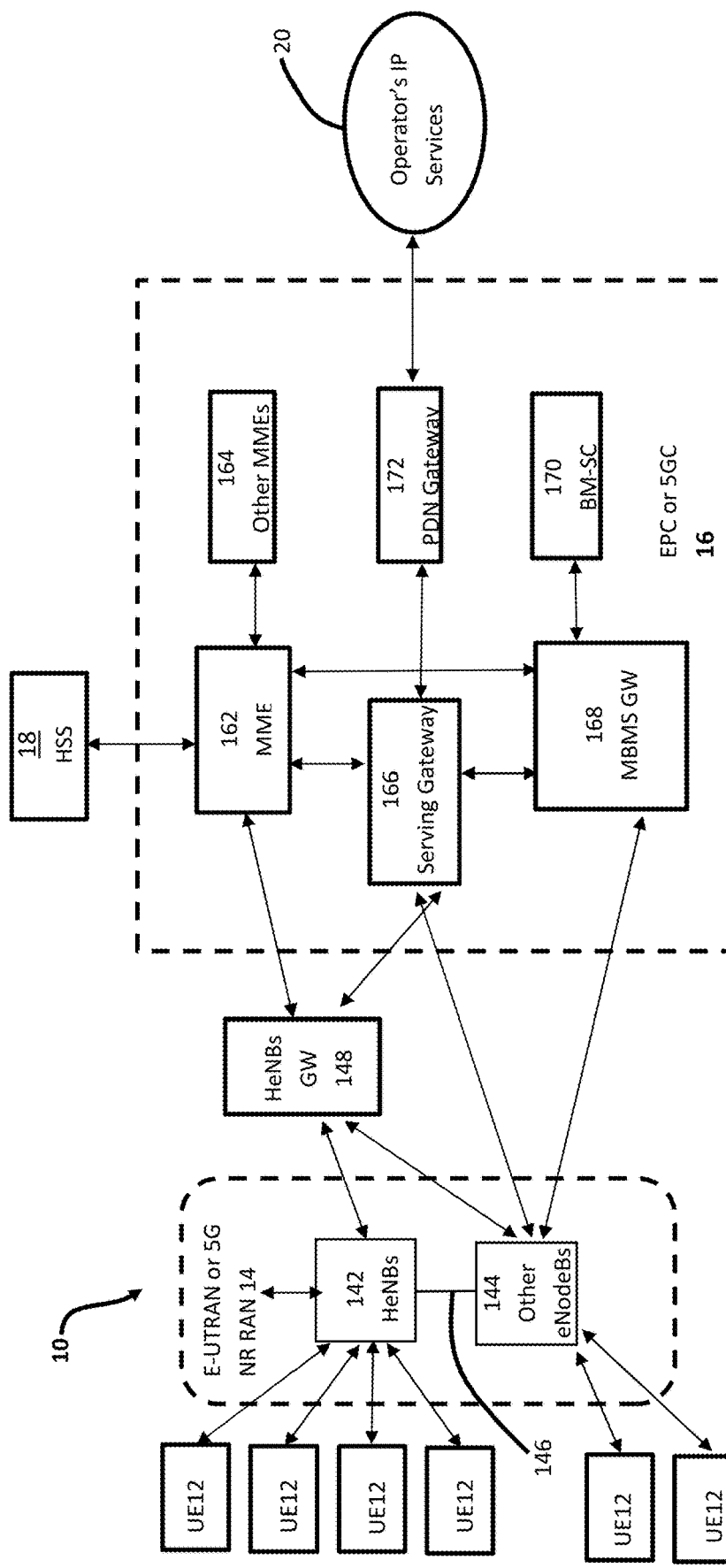
FIG. 1 is a diagram illustrating by way of example only a network architecture for embodiments of the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

FIG. 1 is a diagram illustrating, merely by way of example only, an LTE network architecture 10 in which the methods of the present application can be performed, but it will be understood by one skilled in the art that the methods may be performed in other network architectures, including an LTE network modified to operate the 5G NR standard or interoperate with a 5G Next Generation Core (5GC) network. It will further be understood that, as 5GC networks fully develop and are implemented, the methods of the invention described herein can be performed wholly within such networks.

The LTE network architecture 10 of FIG. 1 may be referred to as an Evolved Packet System (EPS) 10. The EPS 10 may include one or more user equipment (UE) 12, an Evolved UMTS Terrestrial Radio Access Network (E-UTRAN) 14, an Evolved Packet Core (EPC) 16, a Home Subscriber Server (HSS) 18, and an Operator's Internet Protocol (IP) Services 20. The EPC 16 can interconnect with other access networks, but for simplicity those entities/interfaces are not shown.

The EPC 16 may be replaced by a 5GC network which may have a different physical configuration to that of the EPC 16 shown in FIG. 1, but the methods of the invention will be able to be implemented by the 5GC network. Therefore, in the following description reference will be made to only the EPC 16 by way of illustrating the steps of the methods of the invention in both 4G and 5G networks.

The E-UTRAN 14 comprises the radio access network (RAN) and this may be replaced by a 5G NR RAN, but the methods of the invention will be able to be implemented by the 5G NR RAN. Therefore, in the following description reference will be made to the E-UTRAN 14 by way of illustrating the steps of the methods of the invention in both 4G and 5G networks.

The E-UTRAN 14 includes a plurality of Home eNodeBs (HeNBs) 142 and other eNodeBs 144. Only one HeNB 142 is shown for reasons of clarity in the drawing. The HeNBs 142 provide user and control plane protocol terminations toward the UEs 12. A plurality of UEs 12 are connected to the HeNBs 142, although only a small number of UEs are shown for reasons of clarify in the drawing. The HeNBs 142 may be connected to other HeNBs and to eNodeBs 144 via a backhaul (e.g., an X2 interface) 146. Each HeNB 142 provides an access point to the EPC 16 for a plurality of UEs 12 via one or more HeNB GW nodes 148, although only one is shown. Each HeNB GW node 148 aggregates user plane data and control plane data for a plurality of HeNBs 142. An HeNB 142 performs the same functions as a standard eNodeB 144 but is optimized for coverage in much smaller areas than macro eNodeBs.

Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device including any IoT compatible devices or the like. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The EPC 16 may include a Mobility Management Entity (MME) 162, other MMEs 164, a Serving Gateway (SGW) 166, a Multimedia Broadcast Multicast Service (MBMS) Gateway 168, a Broadcast Multicast Service Center (BM-SC) 170, and a Packet Data Network (PDN) Gateway 172. The MME 162 is the control node that processes the signaling between the UE 12 and the EPC 16. Generally, the MME 162 provides bearer and connection management. All user IP packets for eNodeBs 144 are transferred through the SGW 166 which itself is connected to the PDN Gateway 172, but user packets for the HeNBs 142 are transferred through the HeNB GW node 148. The network preferably has a plurality of HeNB GW nodes 148 for serving the HeNBs 142 and the UEs 12.

FIG. 2 is a diagram illustrating an example of an access network 200 in an LTE network architecture such as that described with respect to FIG. 1. In this example, the access network 200 is divided into a number of cellular regions (cells) 202. There is no centralized controller in this example of an access network 200, but a centralized controller may be used in some configurations. The eNodeBs 204 may be configured to provide all radio related functions including radio bearer control, admission control, mobility control, scheduling, security, and connectivity to the serving gateway 166. An eNodeB may support one or multiple cells (also referred to as a sector). The term "cell" can refer to the smallest coverage area of an eNodeB and/or an eNodeB subsystem serving a particular coverage area. Further, the terms "eNodeB," "base station," and "cell" may be used interchangeably herein.

FIG. 3 illustrates a basic structure of an eNodeB 300 for implementing the methods of the invention. The eNodeB 300 has at least one or a small number of antennas but may comprise a massive number of 100 or more antenna elements 302 (only a small number of antenna elements are shown for clarity of the drawing), a communications module 304 for communicating wirelessly with a UE and communicating with other components of a wireless communication system. The eNodeB 300 is also provided with a non-transitory memory 306 storing machine-readable instructions for execution by a processor 308. When executing the machine instructions, the processor 308 configures the BS 300 to implement the methods of the invention.

FIG. 4 illustrates a basic structure of a UE 400 for implementing the methods of the invention. The UE 400 comprises at least one antenna 402 but may include multiple antennas 302 or even a massive number of 100 or more antenna elements 402. It is also provided with a communications module 404 for communicating wirelessly with one or more eNodeBs 300. The UE 400 also has a non-transitory memory 406 storing machine-readable instructions for execution by a processor 408. When executing the machine instructions, the processor 408 configures the UE 400 to implement the methods of the invention.

To place the invention in context, reference is made again to one conventional method for addressing ICI, namely ICIC. In a cellular network including a set of cells, bandwidth is allocated from a radio frequency spectrum. Each cell includes an eNodeB for serving a set of UEs in the cell. An area around each eNodeB is partitioned into a central region and a cell-edge band region. In each eNodeB, cell-center bandwidth for use by the UEs in the central region is reserved according to the ICIC protocol, and cell-edge bandwidth for use by the UEs in the cell-edge band region is also reserved according to the ICIC protocol.

Figure 5:
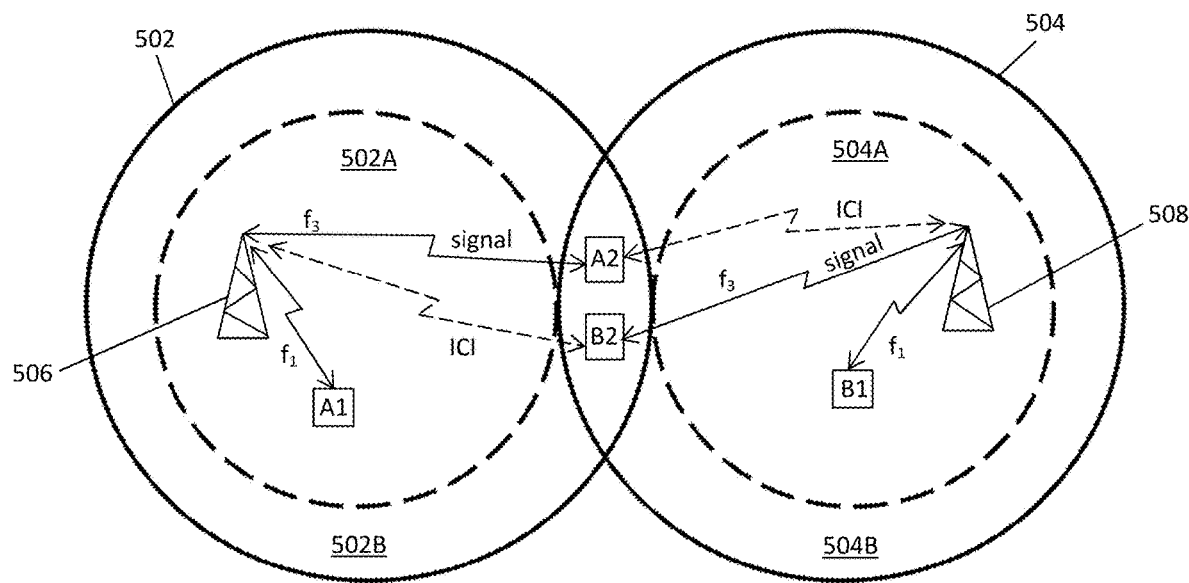
FIG. 5 illustrates a conventional cellular network situation where cell-edge interference occurs.

FIG. 5 shows a conventional cell-edge situation. ICI may be caused when users in different neighboring cells attempt to use the same frequency resource at the same time. As shown in FIG. 5, there are two adjacent cells 502, 504, each having a central region 502A, 504A within the dashed lines and a cell-edge band region 502B, 504B outside the dashed lines. In the case where UEs A1 and B1 each use the same frequency resource f1, but each of UEs A1 and B1 are located in the respective central regions 502A, 504A of their cells 502, 504 and consequently employ low power to communicate with their respective eNodeBs 506, 508, there will be no ICI between A1 and B1, i.e. neither of A1 or B1 will cause ICI to each other or to any other UE in a neighboring cell. However, in the case that there are two UEs A2 and B2 each using the same frequency resource f3 located near to each other in the respective cell-edge band regions 502B, 504B of their cells 502, 504 and consequently employing high power to communicate with their respective eNodeBs 506, 508, they may cause ICI to each other in both uplink and downlink.

ICI is caused because cells only know what radio resources their own UEs are using, and not what other UEs in the neighboring cells are using. For example, in FIG. 5, cell 502 knows what resources UE A2 is using, but not what UE B2 is using, and vice versa. The cells 502, 504 independently schedule radio resources for their own UEs. So, for the UEs at cell edges, i.e. A2 in cell 502 and B2 in cell 504, the same frequency resource can be allocated by their respective eNodeBs 506, 508.

Figure 6:
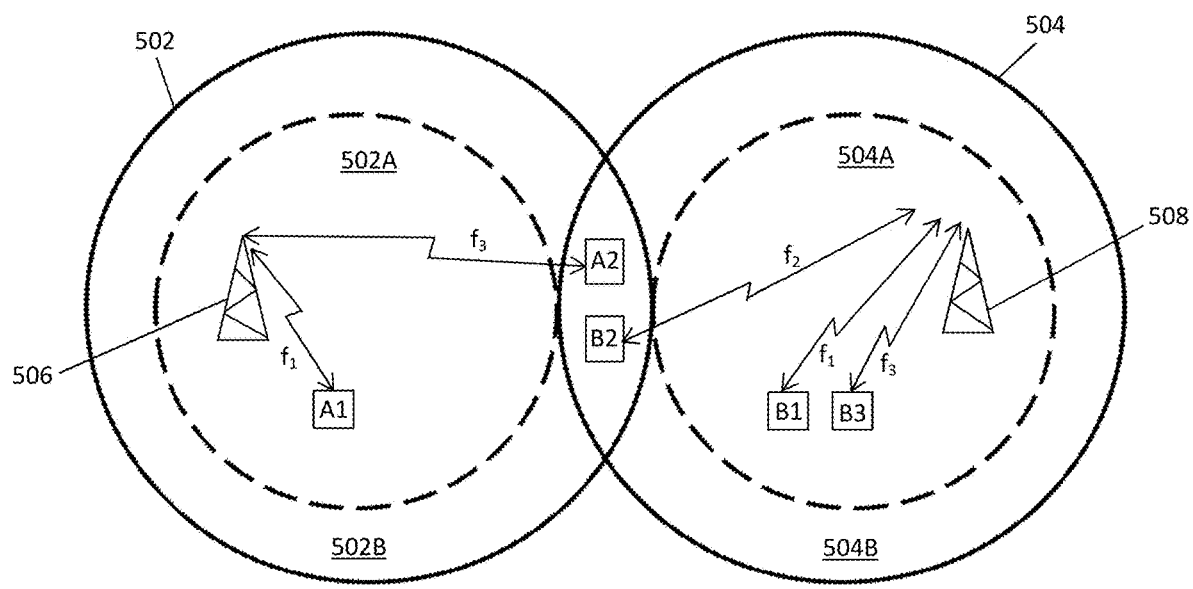
FIG. 6 illustrates a conventional cellular network situation where ICIC is applied to mitigate cell-edge interference in a known manner.

This problem can, however, be mitigated by ICIC as shown in FIG. 6. In FIG. 6, UEs A1 and B1 are allocated frequency resource f1 as before by their respective eNodeBs 506, 508. UE A2 is allocated frequency resource f3 as before, but UE B2 is now allocated frequency resource f2. It should be borne in mind that the cell-edge UEs A2 and B2 are identified when the measured signal strength of their neighbor cell is offset better than that of their serving cell, i.e. the predefined measurement report type "Event A3" in 4G and 5G networks is generated by said UEs. In FIG. 6, a further UE B3, located in the central region 504A of cell 504, is allocated frequency resource f3. It can be seen therefore that, as before, UEs A1 and B1 do not cause ICI to each other or to any other UE in a neighboring cell as they are operating at low power in the central regions 502A, 504B of their cells 502, 504. In contrast to the situation illustrated by FIG. 5, as UEs A2 and B2 have now been allocated with different frequency resources f2, f3, they can operate without causing ICI to each other. Furthermore, UE B2 will not cause ICI to any other UE as it is using a different frequency resource to any other UE. However, what ICIC does not mitigate is the possible ICI caused by UE A2, using frequency resource f3, to UE B3 also using frequency resource f3.

Figure 7:
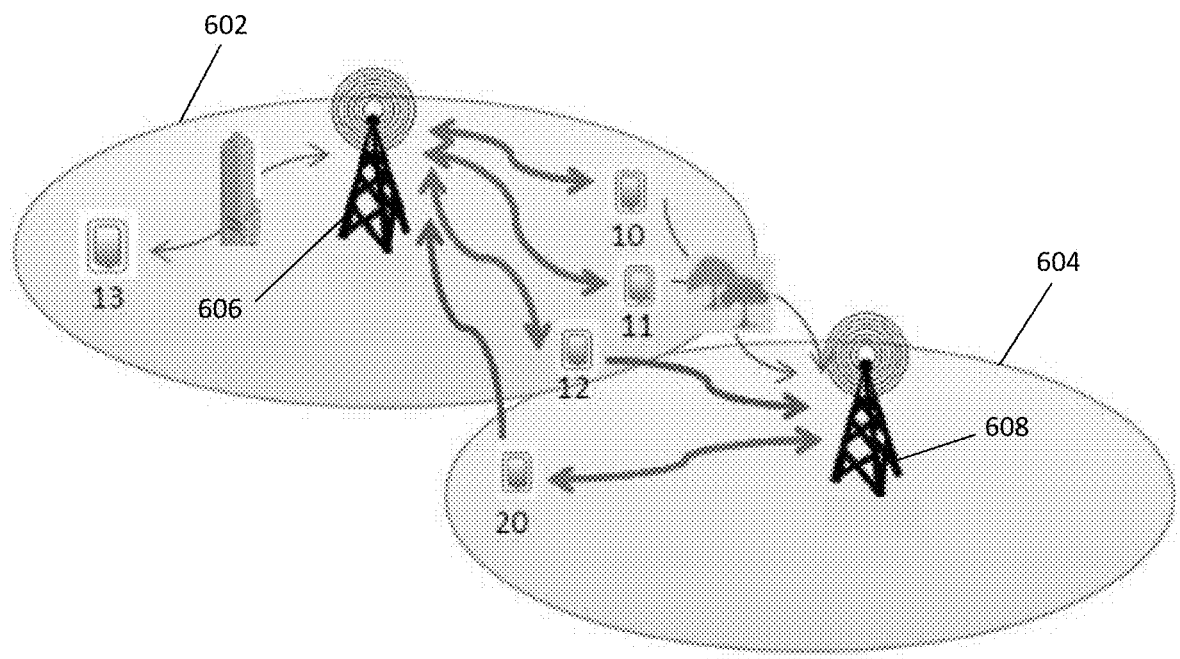
FIG. 7 illustrates a conventional cellular network situation where ICI is not limited to a cell-edge region.
Figure 8:
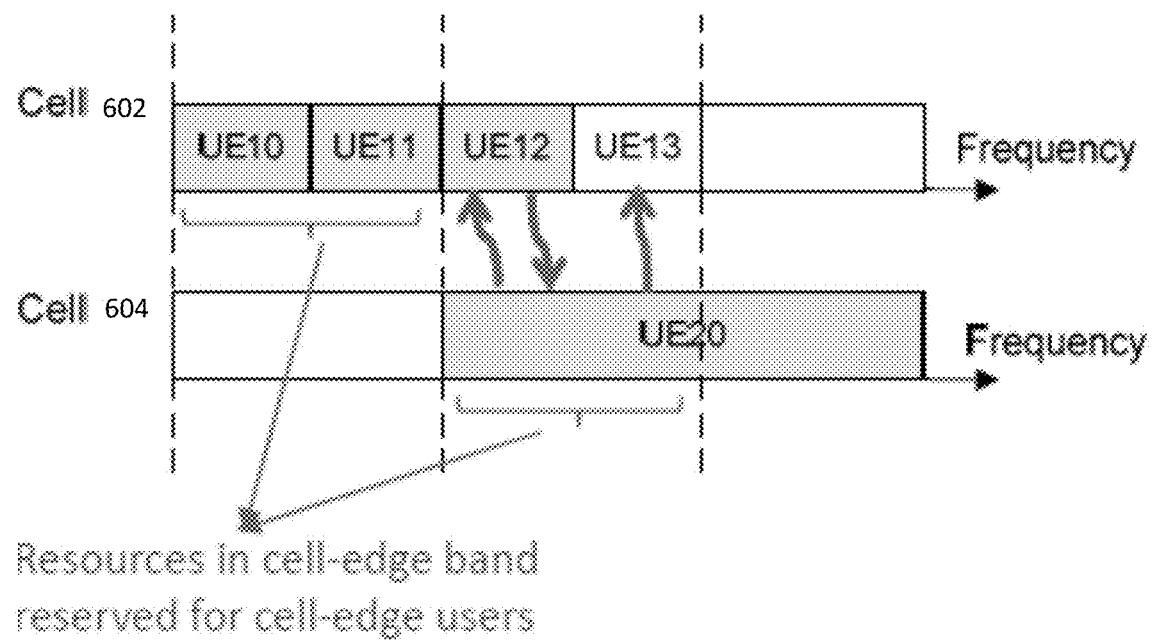
FIG. 8 illustrates frequency resource allocation in the conventional cellular network situation of FIG. 7.

The shortcomings of ICIC are further illustrated by FIGS. 7 and 8. In FIG. 7, it can be seen that a first cell 602 has three identified cell-edge UEs comprising UE10, UE11 and UE12 and one other UE comprising UE13. UE13 has a weak signal strength with its eNodeB 606 whilst each of UE10, UE11 and UE12 has a strong signal strength with eNodeB 606. In an adjacent cell 604, there is a single identified cell-edge UE comprising UE20 having a strong signal strength with its eNodeB 608.

The frequency resource allocations for UE10, UE11, UE12, UE13 and UE20 are shown in FIG. 8. UE10 and UE11 are allocated frequency resources from the cell-edge band of cell 602, but UE12 and UE13 are allocated frequency resources from a part of the bandwidth for cell 602 outside of that reserved for the cell-edge band region of the cell 602. UE20 is allocated frequency resources from the cell-edge band of cell 604, although UE20 may require some additional frequency resources from a part of the bandwidth for cell 604 outside of that reserved for the cell-edge band region of the cell 604. The frequency resources allocated to UE12 and UE13 overlap the frequency resources allocated to UE20.

In the situation illustrated by FIG. 7, the UE20 causes strong ICI with cell 602 and particularly with UE13, whilst UE20 and UE12 cause strong ICI to each other in the uplink and downlink. UE10 and UE11 cause weak ICI with cell 604.

A problem with conventional ICIC is that it does not account for UEs with weak signal strength in the absence of the predefined measurement report type "Event A3" and also does not take into account the interference level caused to a UE in a neighboring cell by an identified cell-edge UE.

The invention as will be described more fully below concerns a method and an apparatus for uplink intercell interference mitigation in cellular, i.e. wireless, communications networks. More specifically, the invention takes into account: UEs with weak signal strengths; and interference caused by a cell-edge UE to one or more UEs in neighboring cells, by providing a method of identifying and sorting the UEs in terms of their signal strengths from low to high and their interference level to UEs in neighboring cells from high to low for the purposes of frequency resource reservation or allocation.

Figure 9:
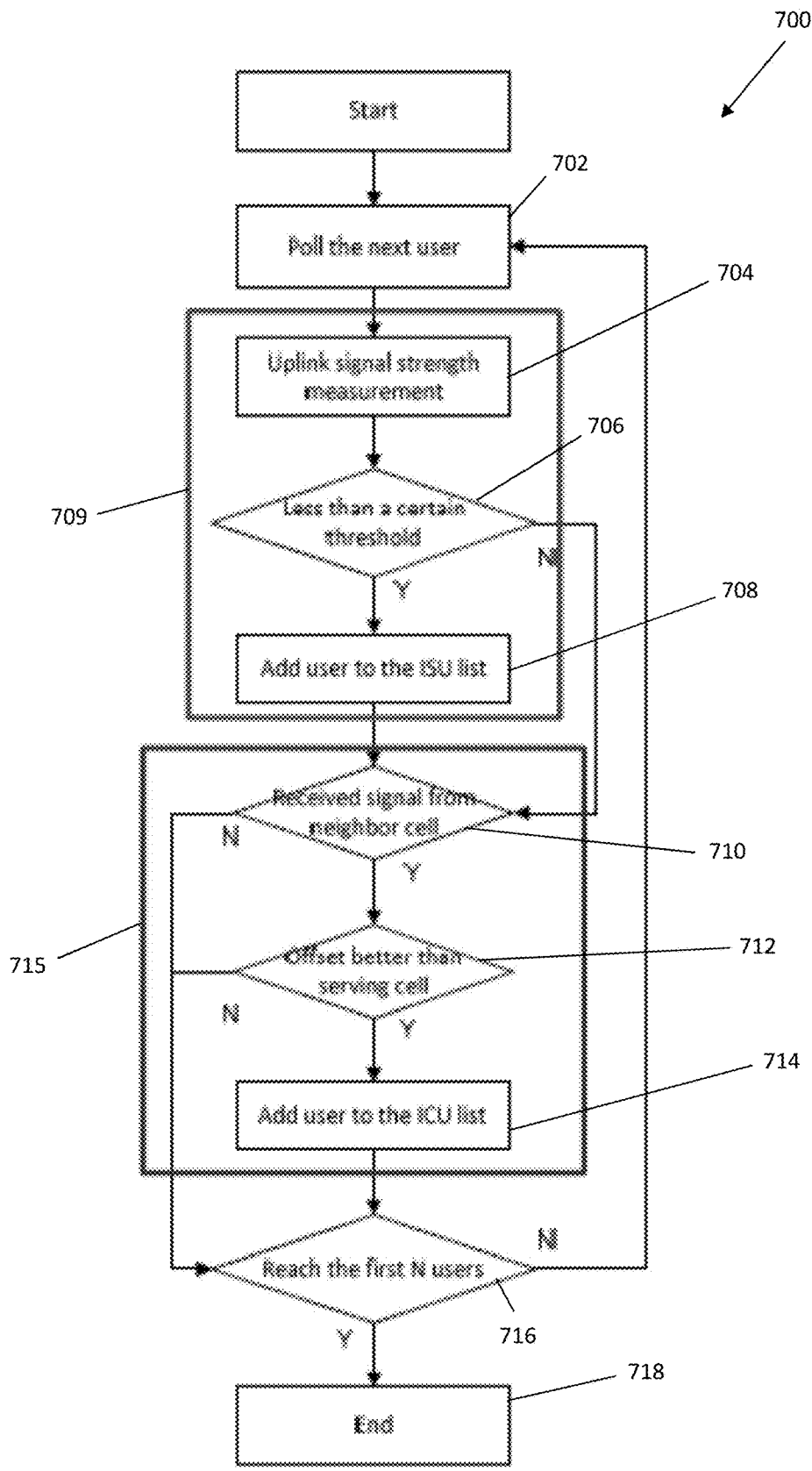
FIG. 9 is a flow chart of a method of identifying UEs as ISUs and as ICUs in accordance with the invention.

FIG. 9 is a flow chart of a method 700 performed in at least one cell of the cellular network, but preferably performed in all cells. The method of FIG. 9 enables an appropriately programmed entity in each cell to identify in said cell UEs which are susceptible to interference (hereinafter referred to as "ISUs") and to identify UEs causing interference (hereinafter referred to as "ICUs") to at least one neighboring cell. The method may be performed by a UE type classification module embodied in the eNodeB 300 of FIG. 3. The UE type classification module may be implemented by any of software, firmware and/or hardware in the eNodeB 300 whereby, when associated machine-readable instructions stored in the memory 306 of eNodeB 300 are executed by the processor 308 of eNodeB 300, this causes the steps of the method of FIG. 9 to be performed at eNodeB 300.

Preferably, method 700 is limited to a set of N UEs in any cell, where N is less than the total number of UEs being served by said cell, although this is not essential. Therefore, an initial step not illustrated in the flow chart of FIG. 9 may be to select N UEs from an eNodeB scheduling user list for said cell. The number N of selected UEs may be determined from an average number of UEs scheduled by said eNodeB for each scheduling user list previously compiled over a predetermined period of time, for example, a previous number of seconds. Alternatively, the number N of selected UEs is equal to n where it is determined that the anticipated frequency resources for a first n UEs from the eNodeB scheduling user list for said cell is less than or equal to the available frequency resources in the entire bandwidth for said cell and where it is determined that the anticipated frequency resources for a first n+1 UEs from said eNodeB scheduling user list is more than the available frequency resources in the entire bandwidth for said cell.

Once a number N of UEs is selected from the eNodeB scheduling user list, a first step 702 comprises polling a UE from the list N of UEs selected from the eNodeB scheduling user list although this step would still apply if the number N equaled the total number of UEs in the eNodeB scheduling user list, i.e. the method was being applied to all UEs served by the cell. Polling is preferably by the UE's index number in the eNodeB scheduling user list. In a next step 704, an uplink signal strength measurement is made for the polled UE and the signal strength measurement is compared at decision box 706 to a predetermined or calculated threshold. If the measured signal strength is below the threshold, the polled UE is added at step 708 to an ISU list. The signal strength for each UE may be based on any of uplink reference signal receiving power (RSRP), uplink signal to interference plus noise ratio (SINR), sounding reference signal (SRS), or demodulation reference signal (DMRS).

Preferably, UEs added to the ISU list are initially ordered in said ISU list by their index numbers. If, however, the measured signal strength is above the threshold, the polled UE is not added to the ISU list and the method moves straight to decision box 710. Steps 704 and 708 and decision box 706 comprise a sub-method 709 of identifying UEs which are susceptible to interference, i.e. identifying ISUs.

The method at decision box 710, which may follow from either step 708 or directly from decision box 706 dependent on the comparison of the measured uplink signal strength of the polled UE to the threshold, comprises determining whether or not a signal has been received from a neighboring cell for said polled UE. If no, the method moves straight to decision box 716. If yes, the method moves to decision box 712 where a determination is made of whether or not the polled UE's measured signal strength from a neighboring cell is offset better than that of its serving cell and/or is higher than a predetermined threshold. If no, the method moves straight to decision box 716. If yes, the method moves to step 714 where the UE is added to an ICU list. The signal strength for each identified ICU may be based on downlink RSRP. Decision boxes 710 and 712 and step 714 comprise a sub-method 715 of identifying UEs causing interference to at least one neighboring cell.

Preferably, UEs added to the ICU list are initially ordered in said ICU list by their index numbers.

At decision box 716, a determination is made as to whether or not all N UEs have been polled. In the case that they have not yet all been polled, the method returns to step 702 to poll the next UE. In the case that they have all been polled, the method ends at 718.

Figure 10:
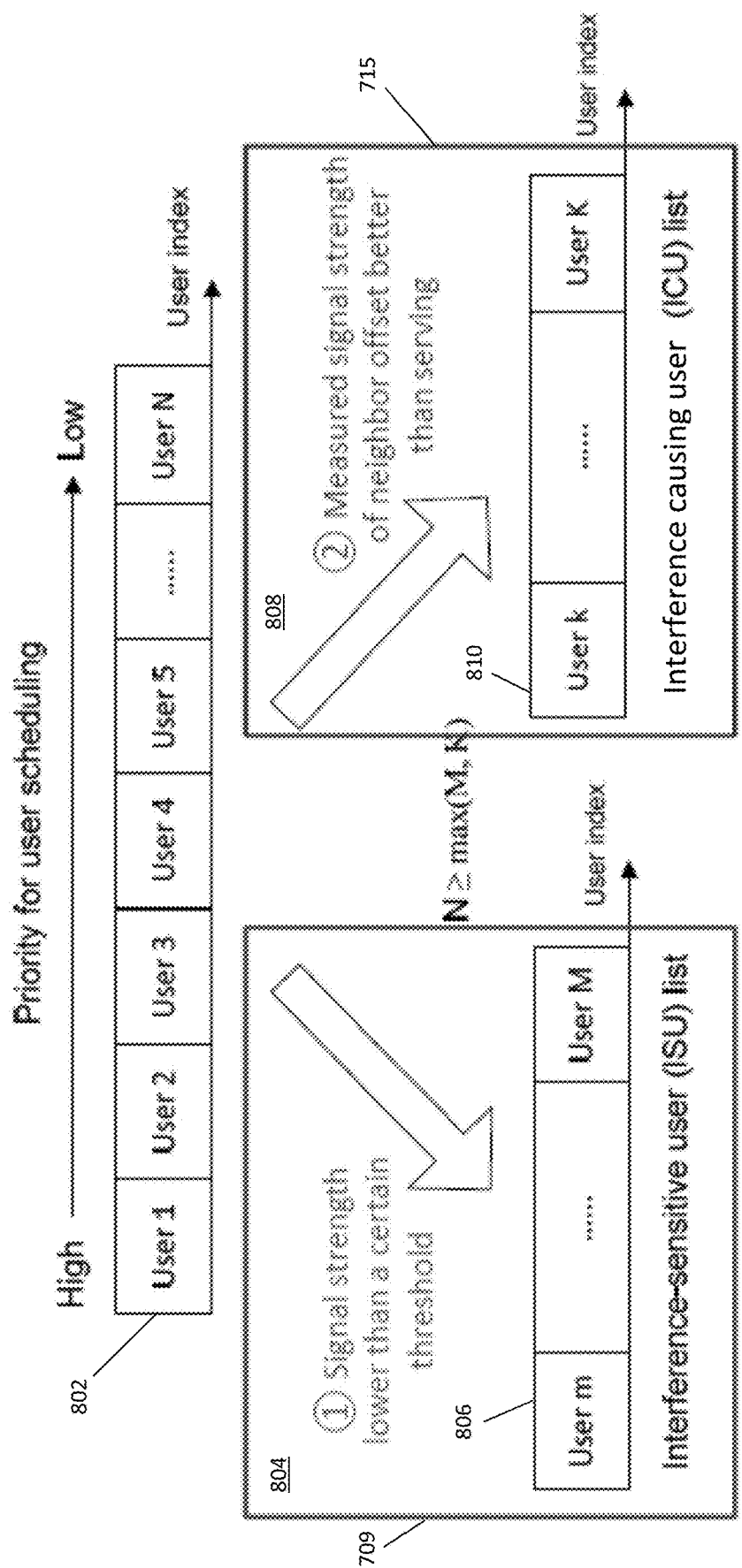
FIG. 10 graphically illustrates the method of FIG. 9.

FIG. 10 more graphically illustrates the method 700 of FIG. 9 where it can be seen that the N selected UEs are ordered in the eNodeB scheduling user list 802 in an order of priority from high to low for reservation or allocation of frequency resources and are thus ordered by a frequency resource allocation index. The priority ordering shown in the eNodeB scheduling user list 802 is prior to the implementation of the method of the present invention which may lead to a very different priority ordering which reduces ICI between neighboring cells. Sub-method 709 is illustrated by box 804 where UEs identified as ISUs are initially placed in an ordered list 806 by index number. Sub-method 715 is illustrated by box 808 where UEs identified as ICUs are initially placed in an ordered list 810 by index number.

Figure 11:
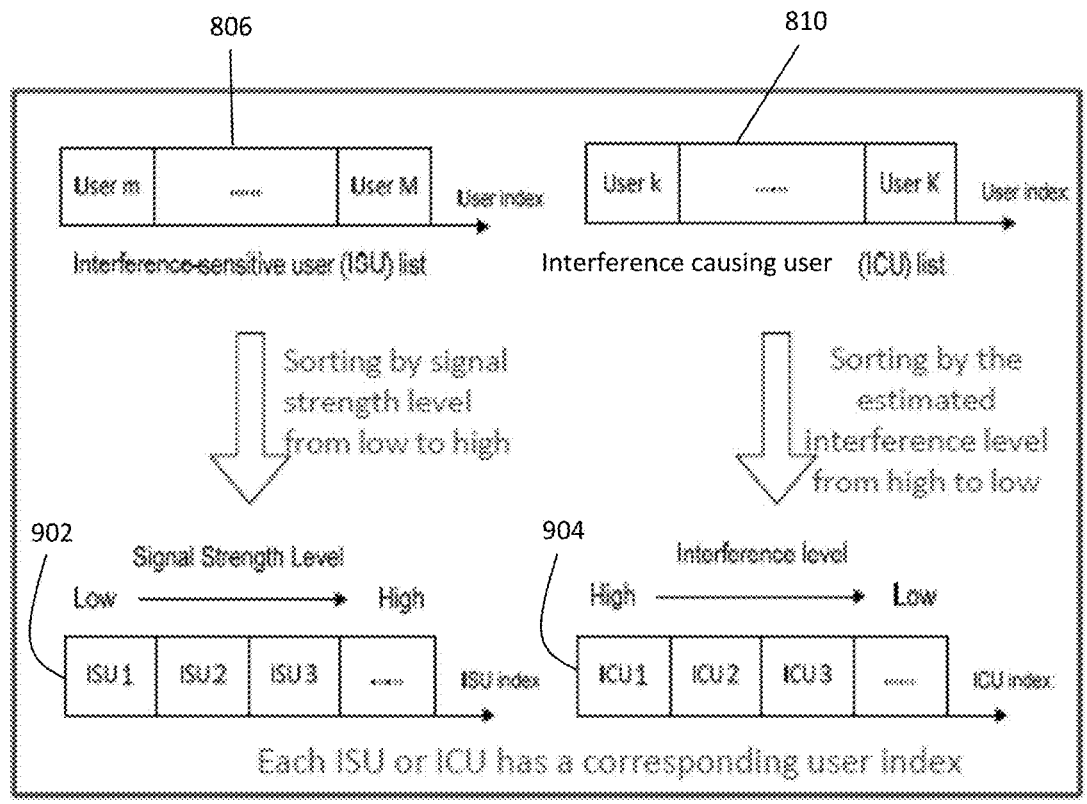
FIG. 11 graphically illustrates a method of sorting ISUs and ICUs in accordance with the invention.

FIG. 11 illustrates how the UEs identified as ISUs and initially placed in an ordered list 806 by index number are then processed or sorted into an ISU ordered list 902 and how the UEs identified as ICUs and initially placed in an ordered list 810 by index number are then processed or sorted into an ICU ordered list 904. Preferably, the ISUs are sorted into ISU ordered list 902 by reference to their signal strengths from low to high signal strength. Preferably, the ICUs are sorted into the ICU ordered list 904 by reference to their level of interference to at least one neighboring cell from high to low level of interference.

Figure 12:
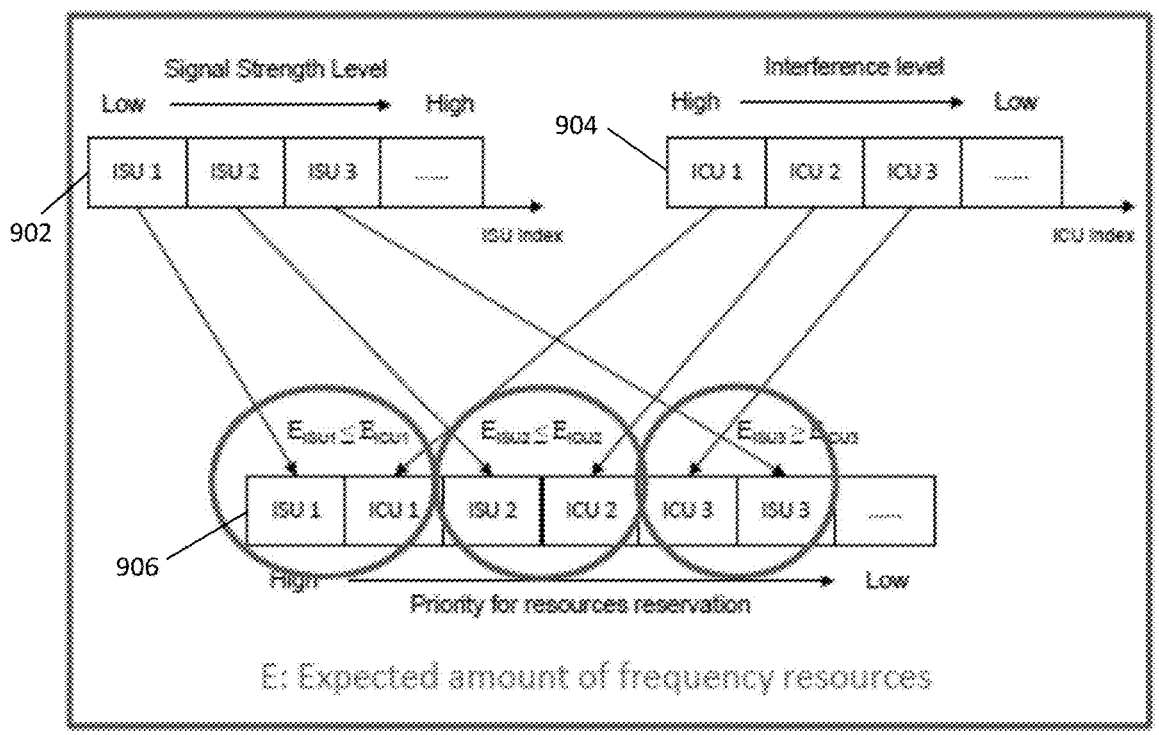
FIG. 12 graphically illustrates a method of forming a priority list of ISUs and ICUs in accordance with the invention.

Once the ISUs and ICUs have been separately sorted into the ISU sorted list 902 and the ICU sorted list 904, they are then combined into a priority list 906 for frequency resource reservation or allocation as illustrated by FIG. 12. In one embodiment, the ISUs and the ICUs are combined into said priority list 906 based on their respective frequency resource requirements such that an ISU or an ICU requiring a lesser amount of frequency resource is allocated a higher priority in the priority list 906. However, it is preferred that the ISUs and ICUs are combined also by interleaving sorted ISUs and sorted ICUs having a same index. In such a method, ISU1 from sorted ISU list 902 is compared to ICU1 from sorted ICU list 904 and placed in order in priority list 906 according to their frequency resource requirements. In FIG. 11, it is judged that ISU1 has a lower frequency resource requirement than ICU1 and so ISU1 is placed in the priority list 906 in front of ICU1, i.e. ISU1 has a higher priority for frequency resource reservation/allocation than ICU1. The above interleaving process is continued for each index pair, e.g. ISU2 with ICU2, ISU3 with ICU3 etc. It can be seen in FIG. 11 that ICU3 has a lower frequency resource requirement than ISU3 and so ICU3 is placed in the priority list 906 in front of ISU3, i.e. ICU3 has a higher priority for frequency resource reservation/allocation than ISU3.

Although not illustrated in the drawings, it will be understood that a UE in a cell may be identified as both an ISU and an ICU. As such, said UE will appear in both the initial ordered list 806 and the initial ordered list 810 by index number and then into the ISU ordered list 902 by low to high signal strength and the ICU ordered list 904 from high to low ICI. The problem that might arise from a UE being processed as both an ISU and an ICU is resolved when the ISU ordered list 902 and the ICU ordered list 904 are combined to form the priority list 906 in that only one of an ISU and an ICU for a same UE having the highest priority will be processed into the priority list 906.

The ISU and ICU sorting and combining methods may be implemented by a UE prioritization module. The UE prioritization module may be embodied in the eNodeB 300 of FIG. 3. The UE prioritization module may be implemented by any of software, firmware and/or hardware in the eNodeB 300 whereby, when associated machine-readable instructions stored in the memory 306 of eNodeB 300 are executed by the processor 308 of eNodeB 300, this causes the ISU and ICU sorting and combining steps to be performed at eNodeB 300.

Once the priority list 906 is established, the method may include determining if an available amount of frequency resources in a cell-edge band of a frequency band for a cell is sufficient to serve the ISUs and ICUs when said ISUs and ICUs are sequentially selected from the priority list 906 for that call. In the case that there are sufficient resources in the cell-edge band, a required amount of frequency resources is then reserved in said cell-edge band. However, if there are not sufficient resources in the cell-edge band, then it may be necessary to reserve an additional amount or the required amount of frequency resources in a non-cell-edge band part of said frequency band for said cell.

Figure 13:
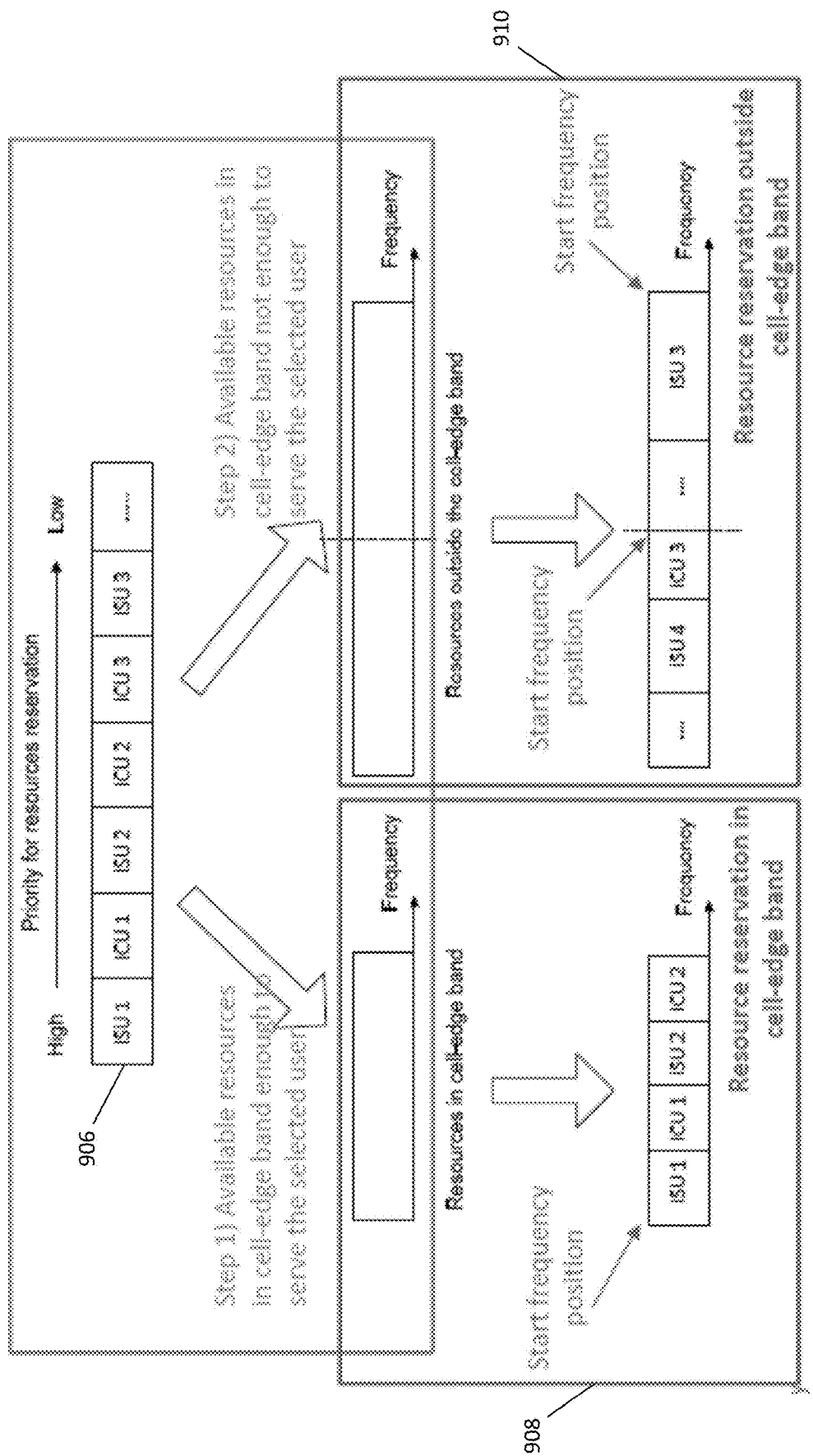
FIG. 13 graphically illustrates a frequency resource reservation method in accordance with the invention.

FIG. 13 illustrates two procedures, namely a band determination procedure and a resource reservation procedure. As illustrated in the upper box of FIG. 13, where each ISU or ICU is being sequentially selected from the priority list 906 in their order of priority, in a first step 1, the band determination procedure determines if there are sufficient frequency resources in the cell-edge band for a selected ISU or ICU. If there are sufficient frequency resources in the cell-edge band for said selected ISU or ICU then, as shown in the lower left-hand box 908, frequency resources from the cell-edge band are allocated to the selected ISU or ICU. In this case, the start frequency for reserving or allocating frequency resources for ISUs or ICUs sequentially selected from the priority list 906 may be a lowest frequency of the cell-edge band. However, where the band determination procedure determines in step 2 that there are not enough frequency resources available in the cell-edge band to serve the sequentially selected ISU or ICU from the priority list 906, then, as shown by the lower the right-hand box 910, frequency resources are allocated to said selected ISU or ICU from outside the cell-edge band. This involves two steps with a first step comprising determining a start frequency position within the non-cell-edge band and a second step of allocating frequency resources starting from said determined start frequency position. The first step comprising determining a start frequency position within the non-cell-edge band may be based on any available resources in (M−1) sub-bands where each of the (M−1) sub-bands has a 1/M fixed portion of the entire bandwidth and is not the cell-edge band. In some embodiments, the start frequency position in the non-cell-edge band may be a highest frequency of the sub-band having index k where sub-band k is the sub-band able to provide the most available resources among (M−1) sub-bands where each sub-band has a 1/M fixed portion of the entire bandwidth and is not the cell-edge band, i.e. sub-band k is selected for resource reservation for a sequentially selected ISU or ICU if the corresponding sub-band can provide the most available frequency resources among all (M−1) sub-bands. Frequency resources are then allocated to sequentially selected ISU or ICU from the determined start frequency position.

The method of determining an available amount of frequency resources may be implemented by a resource reservation module. The resource reservation module may be embodied in the eNodeB 300 of FIG. 3. The resource reservation module may be implemented by any of software, firmware and/or hardware in the eNodeB 300 whereby, when associated machine-readable instructions stored in the memory 306 of eNodeB 300 are executed by the processor 308 of eNodeB 300, this causes the method of determining an available amount of frequency resources to be performed at eNodeB 300.

Figure 14:
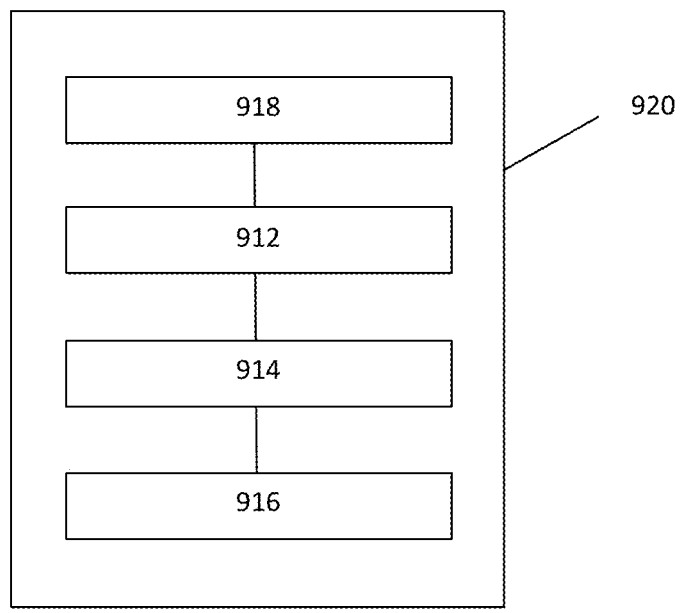
FIG. 14 is a schematic diagram of module for implementing the methods of the invention.

As shown in FIG. 14, the UE type classification module 912, the UE prioritization module 914 and the resource reservation module 916 may comprise a single module 920 in the eNodeB 300 which may also include a cell-edge band selector module 918 for determining a cell-edge band for the cell served by the eNodeB 300.

Figure 15:
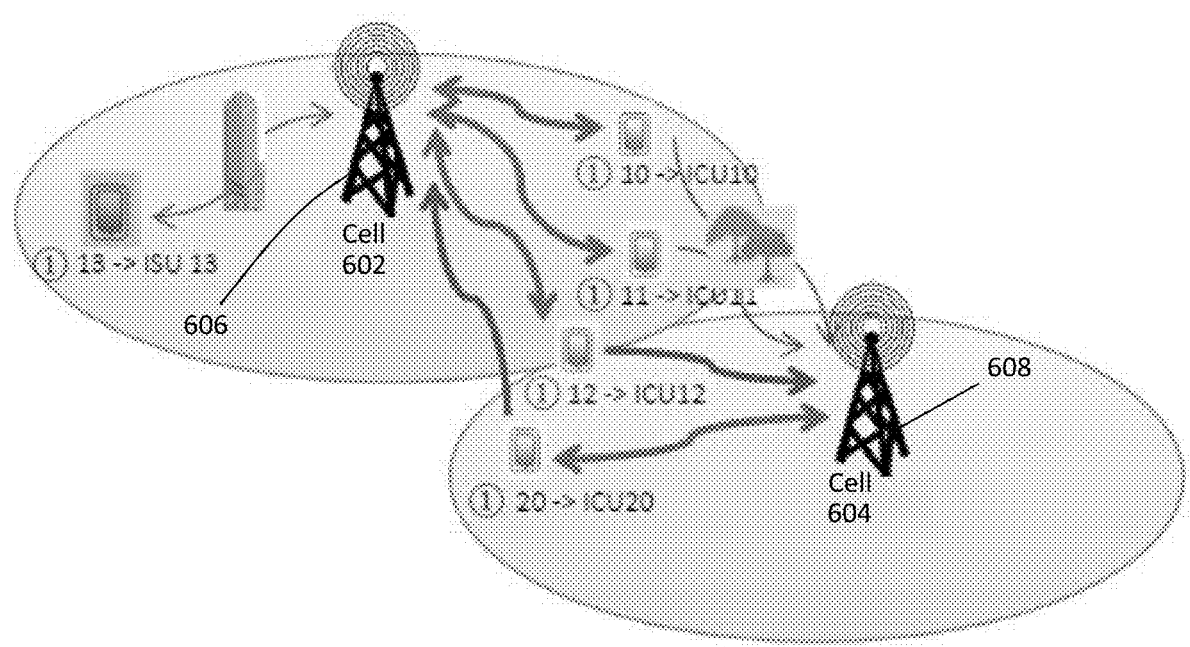
FIG. 15 illustrates a cellular network situation where ICI is mitigated in accordance with the methods of the invention.

FIG. 15 shows a similar network situation to FIG. 7, but where the UEs have been identified as ISUs or ICUs and processed into a priority list 906. Cell 602 comprises eNodeB 606 and ISU13, ICU10, ICU11 and ICU12. Cell 604 comprises eNodeB 608 and ICU20.

Figure 16:
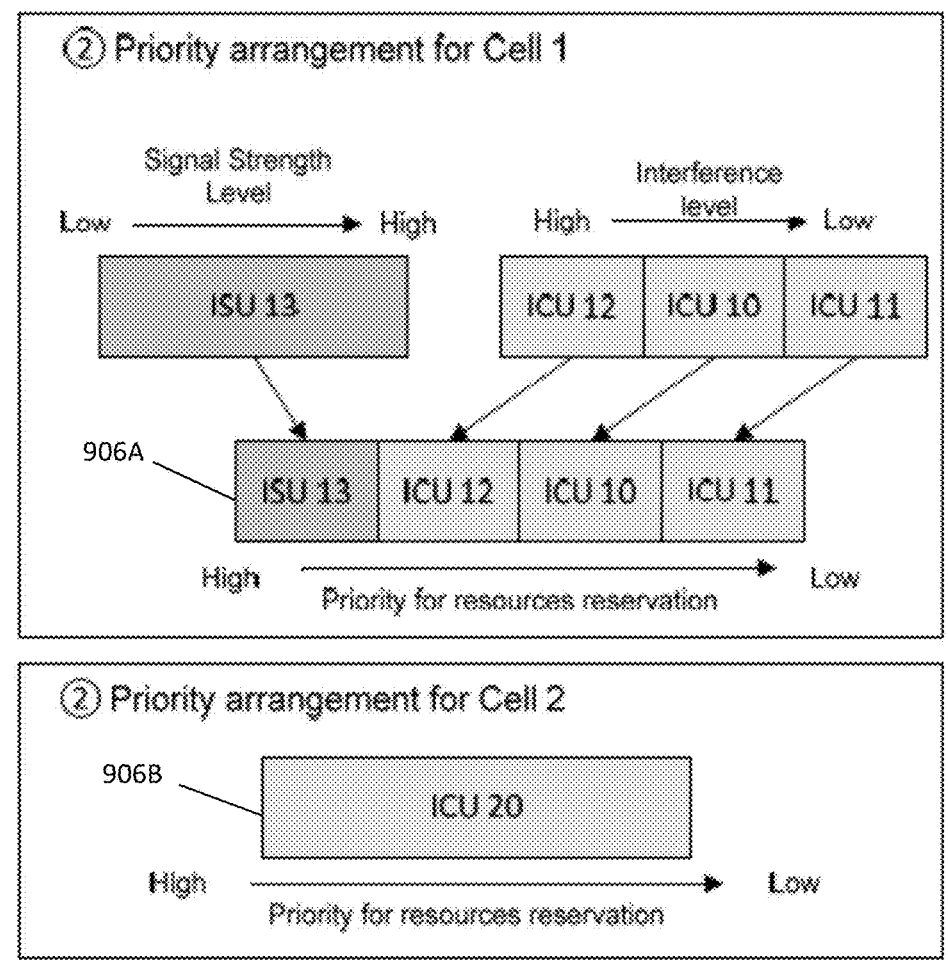
FIG. 16 graphically illustrates priority lists in accordance with the invention for cells in the cellular network situation of FIG. 15.

FIG. 16 shows the priority list 906A for cell 602 and priority list 906B for cell 604 of FIG. 15.

Figure 17:
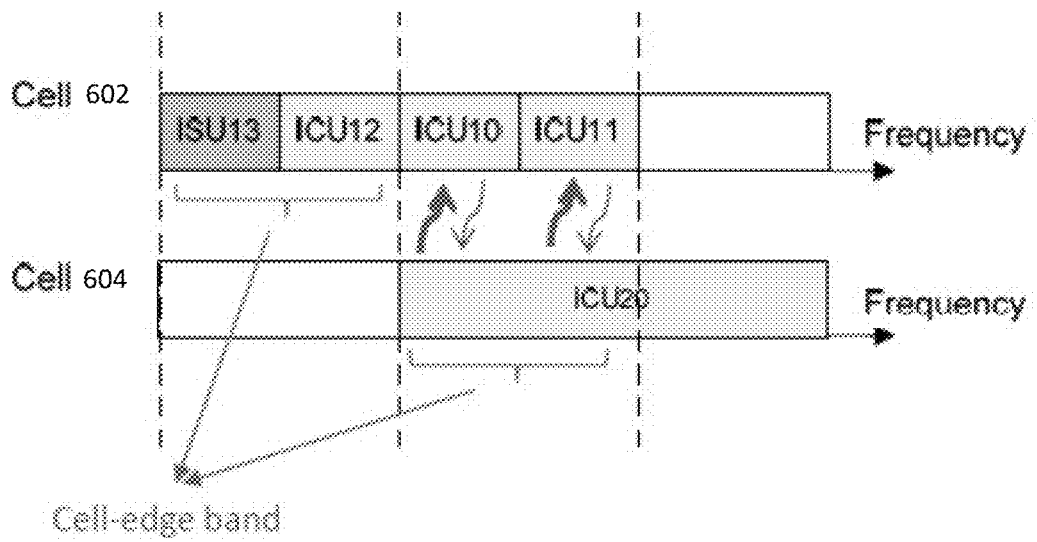
FIG. 17 illustrates frequency resource allocations in accordance with the invention for cells in the cellular network situation of FIG. 15.

FIG. 17 shows the frequency resource allocation for both cells 602, 604 where ICU20 is allocated to the cell-edge band of cell 604 but requiring some additional frequency resources from outside the cell-edge band for cell 604. For cell 602, the priority list 906A requires that UE13 is firstly allocated resources and it is allocated resources from the cell-edge band for cell 602. As such, this mitigates any ICI from ICU20 on ISU13. ICU12 is also allocated resources from the cell-edge band for cell 602 according to priority list 906A and, as such, this mitigates any ICI between ICU12 and ICU20. In this example, ICU10 and ICU11 are allocated resources outside of the cell-edge band of cell 602 and, as such, their allocated resources overlap to some degree with the resources allocated to ICU20 in cell 604. Consequently, there is some ICI between ICU20 and ICU10 and ICU11, but the level of ICI experience by ICU20 is significantly less than the network situation of FIG. 7. Overall, the method of the invention enables a considerable reduction in ICI for the network situation of FIG. 15 compared to that of FIG. 7.

In some embodiments of the invention, a level of interference caused by an ICU in a cell i to a neighboring cell j may be determined from $RSRP_{ul,l}+\Delta RSRP_{dl,ij}$, where the $RSRP_{ul,i}$ is the uplink RSRP of the ICU to its serving cell l and $\Delta RSRP_{dl,ij}$ is the downlink RSRP difference between the neighboring cell j and the serving cell i.

In some embodiments, a cell-edge band of a frequency band for the cell may comprise a 1/M fixed portion of the entire bandwidth of the cell frequency band and wherein an index of the cell-edge band is given by the Physical Cell Identity (PCI) mod M, where M is determined by network planning. The maximum value of M will be the number of neighboring cells immediately adjacent to a serving cell as these are the neighboring cells which contribute most ICI to the serving cell. Thus, the maximum value of M is typically 6 in 4G and 5G networks. In this case, an optimum value of M would be 3 where good network planning is applied to mitigate ICI using conventional methods.

The method of the invention can, as described in the foregoing, be implemented in a cellular network without requiring any hardware modification of update but can be implemented through a software update to a cell base station. Furthermore, the method of the invention does not require any communication among different wireless cells thereby enabling the cell base stations to run independently of each other.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of reducing uplink inter-cell interference in a cellular communications network, comprising the steps of:
   a) generating a first sorted set of user equipments (UEs) in a cell which are susceptible to interference by selecting any polled UEs in said cell whose measured uplink signal strength at a base station of said cell is below a first predetermined threshold;
   b) generating a second sorted set of UEs causing interference to at least one neighboring cell by selecting any polled UEs in said cell whose measured level of interference to a neighboring cell is higher than a second predetermined threshold; and
   c) combining the UEs of said first sorted set of UEs and said second sorted set of UEs into a priority list for frequency resource reservation or allocation in said cell;
   wherein step c) comprises:
   sorting the first sorted set of UEs by reference to their measured uplink signal strengths from low to high signal strength;
   sorting the second sorted set of UEs by reference to their level of interference to at least one neighboring cell from high to low level of interference to said at least one neighboring cell; and
   interleaving the UEs of the first sorted set of UEs and the UEs of the second sorted set of UEs in UE pairs having a same index and according to their respective frequency resource requirements;
   wherein performing method steps a) to c) does not require any communication between the base station of said cell and a base station of the at least one neighboring cell and wherein said first sorted set of UEs and said second sorted set of UEs are not mutually exclusive sets of UEs.

2. The method of claim 1, wherein the sorting steps are performed prior to step c) of claim 1.

3. The method of claim 1, wherein step c) comprises combining the UEs of the first sorted set of UEs and the UEs of the second sorted set of UEs into said priority list based on their respective frequency resource requirements such that a UE from said first set of sorted UEs or a UE from said second set of sorted UEs requiring a lesser amount of frequency resource is allocated a higher priority in the priority list.

4. The method of claim 1, wherein the measured uplink signal strength for each polled UE is based on any of uplink reference signal receiving power (RSRP), uplink signal to interference plus noise ratio (SINR), sounding reference signal (SRS), or demodulation reference signal (DMRS).

5. The method of claim 1, wherein the measured level of interference for each polled UE selected for said second sorted set of UEs is based on downlink RSRP.

6. The method of claim 1, comprising an initial step of selecting N UEs from a base station scheduling user list for said cell and performing steps a) to c) with respect to only said selected N UEs.

7. The method of claim 6, wherein the number N of selected UEs is determined from an average number of UEs scheduled by said base station for each scheduling user list previously compiled over a predetermined period of time.

8. The method of claim 6, wherein the number N of selected UEs is equal to n where it is determined that the anticipated frequency resources for a first n UEs from a base station scheduling user list for said cell is less than or equal to the available frequency resources in the entire bandwidth for said cell and where it is determined that the anticipated frequency resources for a first n+1 UEs from said base station scheduling user list is more than the available frequency resources in the entire bandwidth.

9. The method of claim 1, wherein a step of identifying at least one neighboring cell suffering from interference comprises using measurement reports generated by the UEs of the second sorted set of UEs.

10. The method of claim 1, wherein a level of interference caused by a UE of the second sorted set of UEs in a cell i to a neighboring cell j is determined from $RSRP_{ul,i} + \Delta RSRP_{dl,ij}$, where the $RSRP_{ul,i}$ is the uplink RSRP of the UE of the second sorted set of UEs to its serving cell l and $\Delta RSRP_{dl,ij}$ is the downlink RSRP difference between the neighboring cell j and the serving cell i.

11. The method of claim 1, further comprising the step of:
determining if an available amount of frequency resources in a cell-edge band of a frequency band for said cell is sufficient to serve the first sorted set of UEs and second sorted set of UEs when UEs from said first sorted set of UEs and second sorted set of UEs are sequentially selected from the priority list; and
if yes, reserving a required amount of frequency resources in said cell-edge band; and
if no, reserving an additional amount or the required amount of frequency resources in a non-cell-edge band part of said frequency band for said cell.

12. The method of claim 1, wherein a cell-edge band of a frequency band for the cell comprises a 1/M fixed portion of the entire bandwidth of the cell frequency band and wherein an index of the cell-edge band is given by the Physical Cell Identity (PCI) mod M, where M is determined by network planning.

13. The method of claim 1, wherein a start frequency position for resource reservation in a cell-edge band of a frequency band for the cell is a lowest frequency of the cell-edge band.

14. The method of claim 1, wherein a start frequency position for resource reservation in a non-cell-edge band part of a frequency band for the cell is based on any available resources in (M-1) sub-bands where each of the (M-1) sub-bands has a 1/M fixed portion of the entire bandwidth and is different from the cell-edge band.

15. The method of claim 1, wherein a start frequency position for resource reservation in a non-cell-edge band part of a frequency band for the cell is a highest frequency of the sub-band having index k if the sub-band with index k is able to provide the most available resources among (M-1) sub-bands where each sub-band has a 1/M fixed portion of the entire bandwidth and is different from the cell-edge band.

16. An apparatus for reducing uplink inter-cell interference in a cellular communications network, said apparatus configured to:
a) generate a first sorted set of user equipments (UEs) in a cell which are susceptible to interference by selecting any polled UEs in said cell whose measured uplink signal strength at a base station of said cell is below a first predetermined threshold;
b) generate a second sorted set of UEs causing interference to at least one neighboring cell by selecting any polled UEs in said cell whose measured level of interference to a neighboring cell is higher than a second predetermined threshold; and
c) combine the UEs of said first sorted set of UEs and said second sorted set of UEs into a priority list for frequency resource reservation or allocation in said cell;
wherein step c) comprises:
sorting the first sorted set of UEs by reference to their measured uplink signal strengths from low to high signal strength;
sorting the second sorted set of UEs by reference to their level of interference to at least one neighboring cell from high to low level of interference to said at least one neighboring cell; and
interleaving the UEs of the first sorted set of UEs and the UEs of the second sorted set of UEs in UE pairs having a same index and according to their respective frequency resource requirements;
wherein said apparatus does not require any communication with a base station of the at least one neighboring cell to perform steps a) to c) and wherein said first sorted set of UEs and said second sorted set of UEs are not mutually exclusive sets of UEs.

* * * * *